J. E. MONIGHAN.
SIGNAL.
APPLICATION FILED MAR. 11, 1915.
1,267,248.
Patented May 21, 1918.
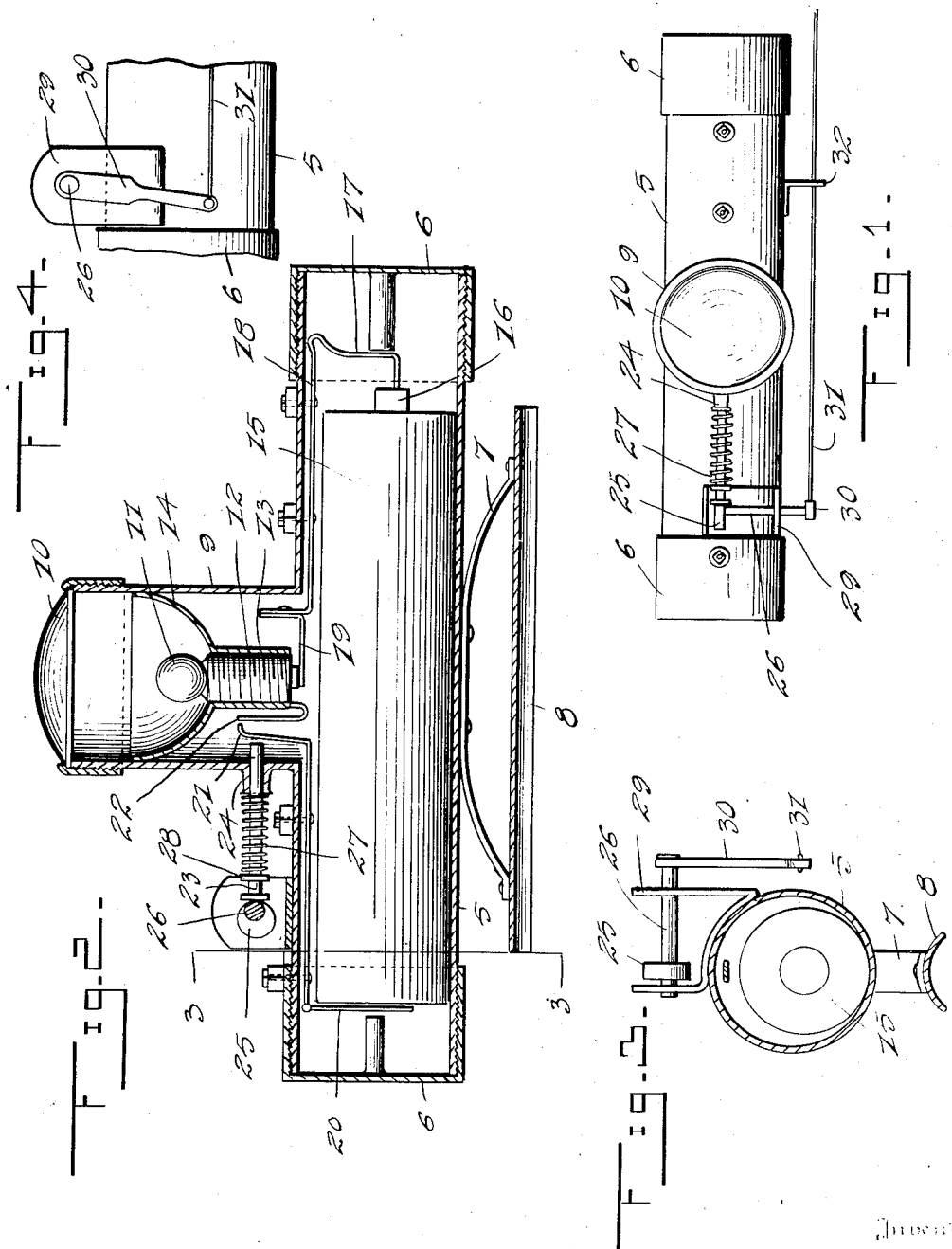
Witnesses
C. R. Beall.
Chas. Beeler
Inventor
J. E. Monighan.
By
[signature]

UNITED STATES PATENT OFFICE.

JOHN EMERY MONIGHAN, OF TOLEDO, OHIO.

SIGNAL.

1,267,248.

Specification of Letters Patent.

Patented May 21, 1918.

Application filed March 11, 1916. Serial No. 83,595.

*To all whom it may concern:*

Be it known that I, JOHN EMERY MONIGHAN, a citizen of the United States, residing at Toledo, in the county of Lucas and State of Ohio, have invented certain new and useful Improvements in Signals; and I do hereby declare the following to be a full, clear, and exact description of the invention, such as will enable others skilled in the art to which it appertains to make and use the same.

This invention relates to a signal, and more particularly to a visible signal especially designed for use by fishermen when fishing at night for giving a signal when a fish "bites" at the bait carried by the end of the fishing line.

The invention has for its primary object to provide a simple and inexpensive signal of this character applicable to a fishing pole or rod and operable by pull exerted upon the fishing line.

With this and other objects in view, the invention consists in the novel combination and arrangement of parts as will be more fully hereinafter described in the following specification and accompanying drawings, in which, Figure 1 represents a top plan view of the improved signal, Fig. 2 represents a longitudinal sectional view therethrough, Fig. 3 represents a transverse sectional view on a line 3—3 of Fig. 2, Fig. 4 represents a fragmental side elevation of the signal.

Referring to the drawings in detail, wherein similar reference numerals indicate similar parts throughout the several views thereof, the numeral 5 indicates a cylindrical casing having open ends over which are secured to movable caps 6. A bow 7 is secured laterally of the casing 5, and is connected with a curved plate 8 adapted to be secured beneath the usual reel-securing rings, with which fishing rods are ordinarily equipped. The side of the casing 5 opposite the plate 8 is formed with a laterally projecting tubular extension 9, in the outer open end of which is arranged the lens 10, through which the light rays from an electric incandescent lamp 11 pass. The base 12 of the lamp is positioned in a socket 13, secured in the tubular extension 9, and the substantially parabolic reflector 14 is arranged in the extension behind the bulb on the lamp 11.

An electric battery 15 is arranged in the casing 5, and one of the poles 16 thereof is engaged with the angular spring arm 17 of a conductor 18, arranged within the casing 5 and terminating adjacent the inner end of the base 12 of the lamp in a spring contact 19, adapted for engagement with the center electrode of the lamp base 12. The opposite pole of the battery 15 is connected with a conductor 20, which extends longitudinally within the casing 5 and is connected with a spring contact arm 21 extending between the wall of the tubular extension 9 and the socket 13. The spring contact 21 is movable against an arm 22 electrically connected with the socket 13 for completing the circuit to the lamp 11 for lighting the latter.

The spring contact 21 is moved against the arm 22 by a slide rod 23 slidably mounted in a guide 24 carried by the tubular extension 9 and engaging at its exposed end with a cam or eccentric 25 secured upon a shaft 26. The slide rod 23 is normally retained in outwardly extended or inoperative position by the tension of a spring 27, engaged at one end with the guide 24, and at its opposite end with an integral collar 28 formed upon the slide rod 23.

The shaft 26 is supported in a substantially U-shaped bearing 29 carried by the tubular casing 5 and one end thereof is connected with an operating crank arm 30, having an aperture in the free end thereof in which is secured one end of the fishing line 31. The line 31 extends longitudinally of the casing 5 toward the outer end of the fishing rod, (not shown) and is received in an apertured guide 31ª secured to the casing 5 in spaced relation to the extremity of the arm 30.

In use, the signal is attached to a fishing rod by engaging the rings, ordinarily provided for securing the fishing line reel, over the ends of the plate 8. The fishing line 31 is secured to the outer free end of the arm 30, extends forwardly through the guide 32 and the guides ordinarily provided upon the fishing rod, and the opposite end of the line carries the usual bait. A fish in an effort to consume or escape with the bait pulls the fishing line 31 longitudinally, thus rocking the shaft 26 and causing the slide rod 23 to be moved longitudinally by the rotary movement of the cam or eccentric 25. During its longitudinal movement, the rod 23 engages the spring contact 21 and forces the latter against the relatively stationary arm 22, thus completing the electrical circuit to the lamp 11 and lighting the latter, thus giving a signal. When the pull or tension upon the line 31 is relieved, the rod 23 and shaft 26 are automatically returned to normal position by the tension of the spring 27.

What I claim is:—

A signal including a casing, an electric battery arranged therein, a tubular extension projecting laterally of the central portion of the casing, a socket arranged in the extension, a lamp fitted in the socket, a reflector supporting said socket, a relatively stationary contact arm carried by said socket, a spring contact movable against the stationary contact arm, said arm being electrically connected with one electrode of said lamp, a conductor connecting one pole of the battery with said spring contact, means electrically connecting the other pole of the battery with the other electrode of the lamp, a substantially U-shaped bearing member secured to said casing, a shaft journaled in said bearing member, a rod slidably mounted in said extension and adapted to engage said spring contact member to move the latter into engagement with the relatively stationary contact arm, an integral collar carried by said rod, and a spring confined between the lateral extension and the collar and normally retaining the slide rod in contact with the cam.

In testimony whereof I affix my signature in presence of two witnesses.

JOHN EMERY MONIGHAN.

Witnesses:
C. R. LEE,
H. C. HATCHER.